US012760943B2

(12) United States Patent
Leitzel et al.

(10) Patent No.: US 12,760,943 B2
(45) Date of Patent: Oct. 13, 2026

(54) HEAT PUMP HVAC SYSTEM FOR VEHICLE WITH DEICE FUNCTIONALITY

(71) Applicant: MAHLE INTERNATIONAL GMBH, Stuttgart (DE)

(72) Inventors: Lindsey Lee Leitzel, Lockport, NY (US); Mandeep Singh, Markgröningen (DE)

(73) Assignee: MAHLE International GmbH, Stuttgart (DE)

( * ) Notice: Subject to any disclaimer, the term of this patent is extended or adjusted under 35 U.S.C. 154(b) by 277 days.

(21) Appl. No.: 18/544,950

(22) Filed: Dec. 19, 2023

(65) Prior Publication Data

US 2025/0198670 A1 Jun. 19, 2025

(51) Int. Cl.
*F25B 30/02* (2006.01)
*B60H 1/00* (2006.01)

(52) U.S. Cl.
CPC ......... *F25B 30/02* (2013.01); *B60H 1/00321* (2013.01); *B60H 1/00885* (2013.01)

(58) Field of Classification Search
CPC .... B60H 1/0085; B60H 1/00321; F25B 30/02
See application file for complete search history.

(56) References Cited

U.S. PATENT DOCUMENTS

| | | | |
|---|---|---|---|
| 10,562,375 | B2 | 2/2020 | Suzuki |
| 11,198,346 | B2 | 12/2021 | Blatchley |
| 2022/0410663 | A1 | 12/2022 | Kim |
| 2023/0331064 | A1 | 10/2023 | Deschler |

FOREIGN PATENT DOCUMENTS

| | | |
|---|---|---|
| DE | 102015215955 | 3/2017 |
| DE | 102022109395 | 10/2023 |
| EP | 3081408 | 6/2019 |
| EP | 3081409 | 7/2019 |
| JP | 5895665 | 3/2016 |

OTHER PUBLICATIONS

International Search Report and Written Opinion dated Apr. 23, 2025 for CPT/EP2024/086765.

*Primary Examiner* — Nael N Babaa
(74) *Attorney, Agent, or Firm* — Barnes & Thornburg

(57) ABSTRACT

A heat pump system is provided. The system includes a closed loop for refrigerant flow, including an evaporator, an expansion valve, a compressor, a heat pump heater that comprises a first condenser, and a second condenser wherein refrigerant flows continuous through loop and through the components continuously, and a flow of forced air across the heat pump heart and the evaporator. The expansion valve is remotely controllable in order to adjust a refrigerant pressure drop that occurs as refrigerant passes through the first expansion valve. During operation refrigerant may cause moisture to freeze upon the outer heat transfer surface. Periodically the first expansion valve is adjusted to decrease a pressure drop of refrigerant that flows through the first expansion valve thereby transferring heat through the evaporator and to the outer heat transfer surface to cause the frozen layer upon the outer surface of the evaporator to melt.

19 Claims, 3 Drawing Sheets

HEAT PUMP HVAC SYSTEM FOR VEHICLE WITH DEICE FUNCTIONALITY

BACKGROUND OF THE INVENTION

This application relates to automotive HVAC systems that use heat pump technology to generate cool and warm air flows for use in a vehicle's passenger compartment or for other uses.

SUMMARY OF THE INVENTION

A first representative embodiment of the disclosure is provided. The embodiment includes a method of operating a closed loop heat pump system, closed loop heat pump system comprises a closed loop for refrigerant flow, the closed loop comprises a plurality of components that refrigerant flows through, the plurality of components include an evaporator, an expansion valve, a compressor, a heat pump heater that comprises a first condenser, and a second condenser wherein refrigerant flows through loop and through the components continuously, wherein the expansion valve is a first expansion valve that is disposed upstream of and adjacent to the evaporator, wherein the first expansion valve is remotely controllable by a controller in order to adjust a refrigerant pressure drop that occurs as refrigerant passes through the first expansion valve, the method comprises the controller operating the heat pump system in a first mode wherein the heat pump heater transfers heat into a vehicle passenger compartment via a forced air flow thereby, and the evaporator to remove heat from the forced air that flows thereby, wherein during a first mode of operation of the system a refrigerant entering the evaporator may be at or less than a temperature of air that surrounds the evaporator causing heat transfer from air outside of the evaporator through one or more outer walls of the evaporator to the refrigerant flowing therethrough, thereby causing moisture upon the outer heat transfer surface to freeze over time with continued operation;

further comprising the controller operating the heat pump system periodically in a second mode of operation by adjusting a condition of the first expansion valve to cause the pressure drop of the refrigerant as the refrigerant flows through the first expansion valve to decrease such that a pressure of refrigerant entering the evaporator increases such that a corresponding refrigerant temperature increases thereby transferring heat through one or more walls of the evaporator to the outer heat transfer surface to cause the frozen layer upon the outer surface of the evaporator to melt.

Another representative embodiment of the disclosure is provided. The embodiment includes a heat pump system. The heat pump system includes:

a closed loop for refrigerant flow, the closed loop comprises a plurality of components that refrigerant flows through, the plurality of components include an evaporator, an expansion valve, a compressor, a heat pump heater that comprises a first condenser, and a second condenser wherein refrigerant flows continuous through loop and through the components continuously, and a flow of forced air across the heat pump heart and the evaporator;

wherein the expansion valve is first expansion valve that is disposed upstream of and adjacent to the evaporator, wherein the first expansion valve is remotely controllable in order to adjust a refrigerant pressure drop that occurs as refrigerant passes through the first expansion valve, wherein the system is operated such that the heat pump heater transfers heat to a forced air flow across the heat pump heater to generate a flow of warm air for transfer into a vehicle passenger compartment, and the evaporator is operated such that the evaporator removes heat from the forced air across the evaporator to generate a flow of cool air for transfer into the vehicle passenger compartment, wherein during a first mode of operation of the system a refrigerant temperature entering the evaporator may be such that an outer heat transfer surface of the evaporator causes moisture upon the outer heat transfer surface to freeze upon the outer heat transfer surface;

wherein periodically during a second mode of operation of the system the first expansion valve is adjusted to decrease a pressure drop of refrigerant that flows through the first expansion valve such that a pressure of refrigerant entering the evaporator increases such that a corresponding refrigerant temperature increases thereby transferring heat through the evaporator and to the outer heat transfer surface to cause the frozen layer upon the outer surface of the evaporator to melt.

Other representative embodiments of the disclosure are provided and are similar to the Numbered Paragraphs provided at the end of this specification and combinations thereof as discussed below.

Advantages of the resent disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
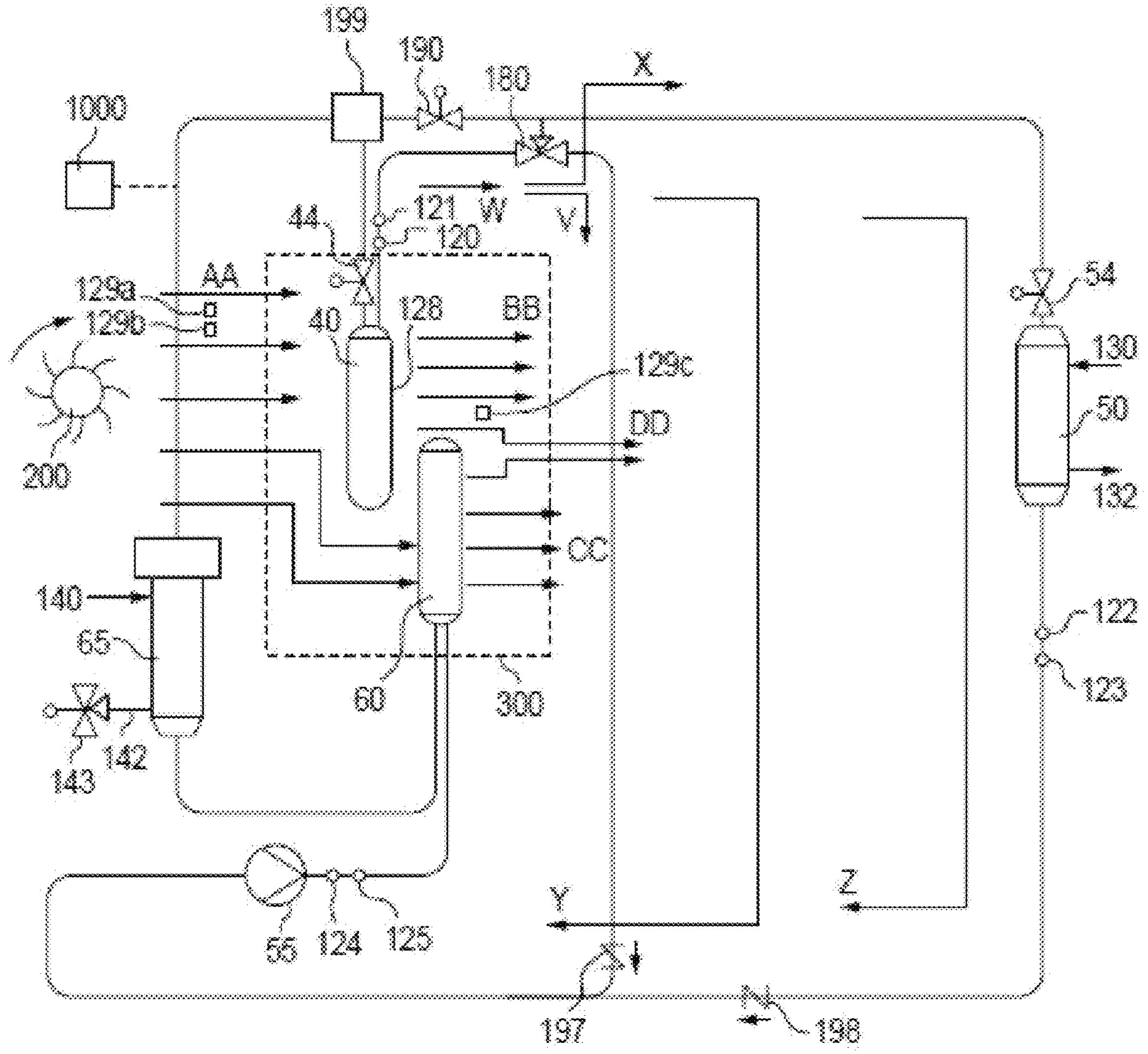
FIG. 1 is a schematic flow diagram of a heat pump system, such as for use in a vehicle, that that is configured to operate with an evaporator deicing cycle.
Figure 2:
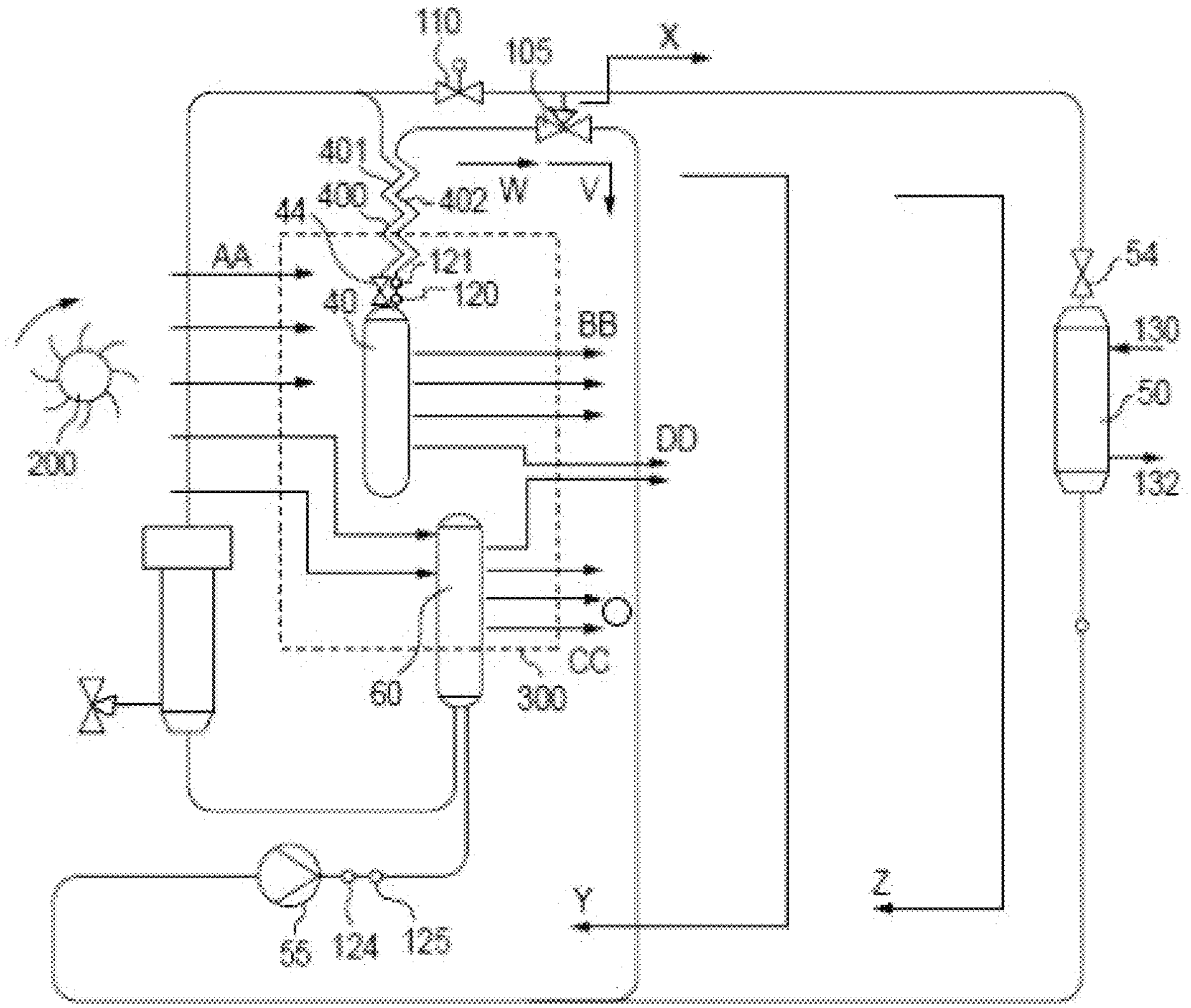
FIG. 2 is a modified schematic flow diagram of FIG. 1 that includes an internal heat exchanger.
Figure 3:
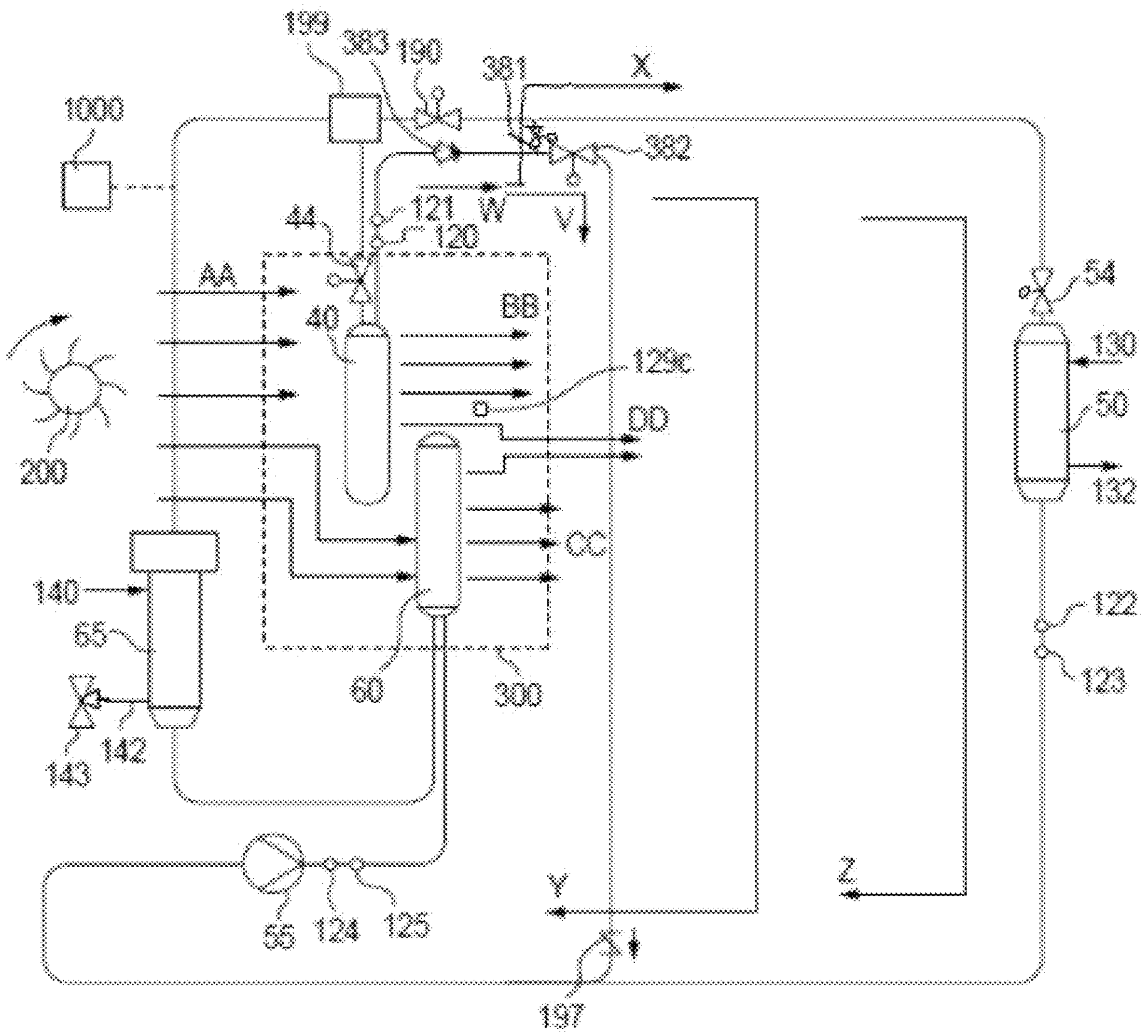
FIG. 3 is a modified schematic flow diagram of FIG. 1 for an alternate embodiment.

Turning now to FIGS. 1-3, a heat pump system 10 is provided. The heat pump system 10 is specifically configured for use in an electric vehicle, i.e. one that runs fully or partially on electricity. The electric vehicle may propel the vehicle with one or more motors and may be powered by electricity that is stored in one or more fuel cells or batteries. In some embodiments, the vehicle may be a hybrid, i.e. a vehicle that has an internal combustion engine to cause vehicle propulsion in some circumstances but also has a battery (or fuel cells) that are configured to power a propulsion system when the internal combustion engine is not being operated. In other embodiments, the system 10 may be used in a vehicle that is powered by an internal combustion engine. The system may be used with one or multiple HVAC assemblies 300 that are configured to receive a flow of air (which may be recirculated vehicle compartment air, external air or combination of both) and create dual flows of warm air and cool air for use for temperature control of the passenger compartment, for vehicle window defrost, or for different purposes within a vehicle.

The system 10 includes an endless flowpath for refrigerant, where the refrigerant flows through the various components of a refrigeration cycle. In the embodiment disclosed herein, the system 10 includes a compressor 55, a heat pump heater 60, a condenser 65, an expansion valve 44 (first expansion valve 44 in embodiments with the second expansion valve 54 and chiller 50 as discussed below), and an evaporator 40. In some embodiments, the system also includes a chiller 50 with a second expansion valve 54 before chiller 50. The system 10 is provided where the heat pump heater 60 and the evaporator 40 are provided within an HVAC assembly (300, schematic) which is provided to interact with air flow AA, which may be forced air flow by a fan 200, and creates a cool flow of air BB and a warm flow 300 for use in a passenger compartment of a vehicle (not shown). In some embodiments a portion of the cool air BB and the warm air CC flows along the same flow path or into a housing that receives and distributes or mixes both the cool air BB and the warm air CC, depicted schematically as air flow DD.

Generally, the system operates as follows: refrigerant gas leaves the evaporator 40 with a low temperature and lower pressure and flows to the compressor 55 (flow path Y, FIG. 1), where it is compressed to a high pressure and superheated vapor. Refrigerant then flows to the heat pump heater 60, which acts as a first condenser, which transfers heat to the air that flows past the heater 60 (schematic AA heating to air flow CC), which reduces the temperature of the refrigerant from a superheated state to a saturated vapor state. This heat is given off from the heat pump heater 60 and transferred to the air flowing past the heater (warm air flow CC). In some embodiments, the refrigerant within the heater 60 reduces to a vapor/liquid mix within the heater. The refrigerant then flows to an internal condenser 65, where the refrigerant transfers heat to the coolant that flows therethrough (140 coolant inlet, 142 coolant outlet with an isolation valve 143 to control the coolant flow).

Refrigerant leaving the internal condenser 65 is typically high pressure saturated liquid. Liquid next flows to the first expansion valve 44 where the refrigerant is expanded thereby reducing the pressure of the refrigerant and changing to a mixture of liquid and vapor, where the refrigerant then flows to the evaporator where the refrigerant vaporizes due to the relatively low pressure of the refrigerant within the evaporator, and the latent heat of vaporization is removed from the air AA that flows past to result in cooler air BB. The cycle then continues indefinitely with continued operation of the compressor 40 and continued air flow AA and cooling water flow 140/142.

In some embodiments, a chiller 50 is provided that receives refrigerant directly from the internal condenser 65 through a second flow path Z depicted in FIG. 1. The flow of refrigerant that flows through the chiller 50 bypasses the first expansion valve 44 and the evaporator 40. The flow path Z includes a second expansion valve 54 that receives a high pressure saturated liquid refrigerant mix from the condenser 65 and thereby reduces the pressure thereby changing the refrigerant to a liquid vapor mix at a lower pressure. The chiller has a flow of coolant (130 inlet, 132 outlet) with heat from the coolant being transferred to the low pressure refrigerant thereby vaporizing the refrigerant to a saturated vapor, with the coolant outlet 132 reducing in temperature due to the latent heat of vaporization transferred to the refrigerant. The refrigerant leaves the chiller as low pressure gas and flows to the compressor 55 where it is compressed to a high pressure gas as discussed above. In some embodiments, the evaporator 40 (receiving the forced air flow AA past the outer surface thereof) and the chiller 50 (receiving the coolant flow 130 therethrough) are operated simultaneously, and the system is configured to allow a desired percentage of flow through the evaporator 40 and then to the compressor 55 (flow Y) and a desired percentage of flow that bypasses the evaporator 40 and flows to the chiller 50 before flowing to the compressor 55 (flow Z) based upon the typical HVAC air cooling loads and the typical cooling water loads.

In some embodiments the system 10 may have an adjustable valve 199 (schematic) that can be adjusted by the controller 1000 (discussed in detail below) to adjust the relative percentages of refrigerant flow to the evaporator 40 and to the chiller 50 based upon the identified system loads and the desired passenger compartment cooling. For example, when the desired passenger cooling increases (or the air inlet temperature AA increases) a higher percentage of the refrigerant may be ported to the evaporator 40 to decrease the temperature of the cool air BB. Alternatively, the controller 1000 may monitor temperatures of various items that are cooled by the coolant flow (132) (e.g. propulsion motors, battery cooling, a radiator—all not shown but conventional) such that refrigerant flow to the chiller 50 is increased of the temperature of the cooling water 132 is desired to decrease or if the flow rate of the cooling water 132 must increase.

The system 10 in normal operations operates the evaporator 40 as a heat source (with respect to the refrigerant) with the goal of producing cool air BB for the vehicle compartment. Operation of the evaporator 40 and specifically the evaporation of the low pressure mixed liquid and vapor refrigerant entering the evaporator causes cooling to the latent heat of vaporization, which results in heat transfer from the evaporator to the refrigerant, and therefore removal of heat of the air that flows past or across the evaporator (schematic, air flow AA to air flow BB). The operation of the evaporator 40 causes the surface temperature of the evaporator to be very low and in some circumstances, especially when the air that flows past the evaporator has a relatively high moisture content, causes the formation of a frost layer on the outer surface of the evaporator 40. This frost layer resists the heat flow from the air (AA) though the evaporator 40 and into the refrigerant thereby reducing the operation of the evaporator 40.

The system 10 is configured to be operated, such as by a controller 1000, to be operated in a deicing mode where the system 10 operates to melt an ice or frost that has formed upon the outer surface, or the air transfer surface (which includes outer surfaces and one or more inner surfaces such as embodiments where air may flow past evaporator surfaces that are formed through inner apertures within the evaporator 40, not shown) of the evaporator 40. The deicing mode and the components that are included in the system 10 to allow for the deicing mode are discussed herein.

The system 10 includes a controllable first expansion valve 44 that allows the first expansion valve 44 to be remotely adjusted (such as caused to adjust by the controller 1000) to modify the refrigerant pressure drop as the refrigerant flows through the first expansion valve 44, thereby adjusting the pressure of the refrigerant that enters into the evaporator 40 (and thereby also effecting the temperature as temperature and pressure are related as understood). The system 10 may also control the second expansion valve 54 to allow for remote adjustment of the pressure drop across the second valve 54 as discussed below.

The system 10 includes a cross-connection between the flow path Y (from the evaporator 40 to the compressor 55 discussed above) and the flow path Z (from the internal condenser 65 to the chiller 50 discussed above) to allow refrigerant flow from the evaporator 40 to flow to the chiller 50 and then to the compressor 55. The system in some embodiments, may include a three way valve 180, which is preferably a remotely operable valve as operated by the controller 1000, which can be operated to two different flows through the system 10. In a first mode (non-deicing mode), the three way valve 180 ports refrigerant flow from the evaporator 40 toward the valve 180 (flow X) and through the valve 180 with flow path Y toward the compressor 55. There is no flow connection between the evaporator 40 and the chiller 50 in this mode, refrigerant flows in parallel with some flowing through flow Y and the remaining refrigerant flowing through the chiller 50 and ultimately to the compressor with flow Z. In a deicing mode, refrigerant flows from the evaporator 40 toward the valve 180 (flow X) and through the valve 180 toward the chiller 50 (flow X through the valve 180). There is no flow through flow path Y that bypasses the chiller 50 in deicing mode.

In some embodiments, an isolation valve 190 may be provided and positioned upstream of a position of where the three way valve 180 connects to the line that bypasses the evaporator 40. In normal operations (i.e. where some refrigerant flow bypasses the evaporator 40 and flows directly from the internal condenser 65 to the chiller 50) the isolation valve 190 is open. In deicing mode, the controller 1000 causes the isolation valve 190 to shut causing all refrigerant flow leaving the internal condenser 65 to flow through the first expansion valve 44 and the evaporator 40.

In some embodiments, the second expansion valve 54 may be controllable to adjust the pressure drop across the valve. For example, in normal mode the second expansion valve 54 is operated to reduce the refrigerant pressure to allow for refrigerant evaporation within the chiller, to remove heat from the cooling liquid to reduce the temperature of the outlet coolant 132, and to cause a saturated vapor to flow to the compressor 55. In some embodiments, when in normal operation the controller 1000 operates both the first and second expansion valves 44, 54 in order to reduce the pressure of the refrigerant entering the respective evaporator 40 and chiller 50 for the desired cooling action upon the air (AA to BB, schematic) and the coolant (130 to 132) and to also result in the saturated refrigerant vapor approaching the compressor 55 in each of flow paths Y and Z to be at the same pressure, or very close pressures to prevent any potential for refrigerant to back flow within the line Y or Z as might be promoted if the refrigerant pressure within one of the lines Y or Z being significantly higher than the refrigerant pressure within the other line. In some embodiments, the one or both of refrigerant lines Y and Z may have check valves (197 for line Y, 198 for line Z) that prevent refrigerant flow in the entering into the line from the other line (i.e. flow from the chiller 50 is prevented from entering into line Y via check valve 197, and vice versa).

In some embodiments, the controller 1000 may control the flow of coolant through the internal condenser 65 (inlet flow 140, outlet flow 142) via a valve 143. In FIG. 1 the valve 164 is depicted on the outlet coolant flow 142, while in other embodiments the valve 164 may be on the inlet flow path 140. The coolant that flows through the internal condenser 65 may be same coolant that is cooled by the chiller 50 as discussed above, or it may be a coolant that is provided via a different system in the vehicle.

In normal operations, the coolant 140/142 flows through the condenser 65 to act as a heat sink for the refrigerant that flows through the condenser 65. As discussed above, refrigerant initially flows through the heat pump heater 60, which acts as a condenser to transfer heat to the air flowing past AA (as urged by the fan 200 in some embodiments) to warmer air CC, thereby changing the refrigerant from superheated steam to saturated steam or potentially to a liquid/vapor mixture. Refrigerant then flows to the internal condenser, where the cooling liquid 140/142 removes additional heat from the refrigerant. This transfers the refrigerant to a high pressure saturated liquid, and potentially allows for subcooling the refrigerant before it leaves the condenser 65 to flow to the expansion valves 44 or 54 that are in parallel to each other. In some embodiments, the controller 1000 may operate valve 143 to throttle the coolant flow through the internal condenser 65 to alter the state of the refrigerant that leaves the internal condenser 65. One of ordinary skill in the art after a thorough review of this specification and an understanding of how changes to the cooling water flow will change the state (pressure, temperature, saturated liquid, or subcooled liquid) of the refrigerant leaving the internal condenser 65 would readily be able to program the controller 1000 to have the capability of throttling the cooling flow 140/142 to adjust the state of the refrigerant as desired for performance of the system. Similarly, one of ordinary skill in the art would be able to program the valve 143 control the operation of the internal condenser 1000 should the cooling water inlet 140 temperature change or the flow rate changes. Alternatively, in normal mode the controller 1000 may maintain the valve 143 open but not have any throttling capability of the valve 143.

In deicing mode, the controller 1000 may fully shut or throttle closed the valve 143 to completely stop or significantly reduce the coolant flow 140/142 through the internal condenser 65. This will eliminate any heat removal from the refrigerant through the condenser 65 (other than de minimis heat loss through the walls of the internal condenser 65 that would be similar to any heat loss through the entire piping of the system to the atmosphere, which is typically accounted for when the system is designed and how the controller 1000 would operate the system in steady state—and would be well understood by one of ordinary skill in the art with a thorough review of this specification and their general knowledge of heat pump systems). Accordingly, in deicing mode the refrigerant leaving the internal condenser 65 is at much higher temperature than the refrigerant the leaves internal condenser 65 during normal operations.

The controller 1000 operates the system 10 in deicing mode as follows. When it is determined that a deicing mode is needed (based upon one or more of the bases for deicing mode discussed below) the controller takes several actions discussed here. The controller 1000 may cause all of these actions to occur (or begin the process of these actions occurring) simultaneously, or the controller 1000 may cause the actions to occur/begin occurring in a staggered fashion. One of ordinary skill in the art with a thorough review of this specification and an understand of the operation of these components of a heat pump cycle would be able to optimize the controller 1000 operation for the desired transition to the deicing mode with merely routine testing and optimization of the specific order for actions to occur. The controller causes the first expansion valve 44 to reorient to reduce the pressure drop across the first expansion valve 44 to cause the pressure of the refrigerant entering the evaporator to increase, which also causes the temperature of the refrigerant to increase due to the pressure/temperature relationship of the pressurized refrigerant within the system.

Also, the controller 1000 causes the three-way valve 180 to reorient such that refrigerant flowing from the evaporator 40 (flow path W) flows through the three way valve and into the line Z that flows toward the chiller 50 (and eliminates flow in the flow path Y). In embodiments where the isolation valve 190 is provided, the controller 1000 causes the valve 190 to shut.

The controller 1000 further may cause the second expansion valve 54 to reorient to reduce (or in some embodiments eliminate) the pressure drop of the refrigerant that flows therethrough and into the chiller 50. This is necessitated because the refrigerant that flows through the second expansion valve 54 in the deicing mode has already had its pressure reduced when flowing through the first expansion valve 44.

Finally, in some embodiments the controller 1000 may reduce or eliminate the coolant flow 140/142 through the internal condenser 65, which as discussed above, reduces the amount of heat that is removed (or eliminates the heat removal) from the refrigerant as it flows through the internal condenser 65.

The combined actions of (i) reducing the pressure drop across the first expansion valve 44, (ii) in some embodiments, closing isolation valve 190 thereby causing all refrigerant flow from the internal condenser 65 to flow to the first expansion valve 44 and the evaporator 40 and repositioning the three-way valve 180 such that refrigerant flowing from the evaporator 40 flows to the chiller 50 (flow path X), and (iii) in some embodiments reducing or eliminating the coolant flow 140/142 through the internal condenser 65 causes any ice or frost that has formed upon the outer surfaces of evaporator 40 to melt, and (iv) reducing (or in some embodiments eliminating) the pressure drop across the second expansion valve 54. This is specifically, because, at least sub-steps (i) and (iii) when performed result in the temperature of the refrigerant that enters the evaporator 40 increasing. This causes the refrigerant temperature to be greater than the evaporator surface temperature and therefore heat flows out of the refrigerant and into the walls of the evaporator 40. The increased wall temperature (particularly somewhat or significantly above 0 degrees C.) causes the frost/ice to melt from the surfaces of the evaporator 40 (the outer surfaces are at atmospheric pressure with a melting point of 0 degrees C.).

The controller 1000 causes the system to be arranged with steps (i), (ii), (iii), and (iv) (in embodiments when all are performed—or with the one or more of steps (i), (ii), (iii), and (iv) when only some are performed) until the controller 1000 has identified that the frost/ice has melted as discussed below as is provided in some embodiments, or after a time within deicing mode when the controller 1000 determines that (or is programmed such that) the all of the ice/frost would have melted, or a substantial portion of the ice/frost in embodiments where the existence of frost/ice is not directly sensed, or another parameter that directly or indirectly reflects that all or a substantial portion of the frost/ice upon the evaporator 40 has melted is reached as discussed below. The term "substantial portion" is defined herein to mean almost all frost/ice such as any remaining ice/frost would not have a meaningful effect on the heat transfer across the evaporator 40 outer wall, but would allow a de minimis amount of ice/frost to remain.

When the deicing has been completed (either directly determined, or indirectly determined) the controller 1000 returns the system 10 for normal operations (i.e. operations where the evaporator 40 is configured to act as a heat sink to generate cool air BB from the inlet air flow AA). The controller 1000 (i) resets the first expansion valve 44 to a typical pressure drop such that the refrigerant that enters the evaporator 40 is at a low enough pressure and a corresponding low enough temperature to cause the refrigerant to vaporize due to the receipt of heat from the air AA flowing past the evaporator 40, (ii) reorients the three way valve 180 to cause flow from the evaporator 40 (flow path W) to flow directly to the compressor 55 (flow path V) and eliminating flow though path W, and opening isolation valve 190 allowing flow from the internal condenser 65 to the chiller 50, (iii) reestablishes normal coolant flow 140/142 the internal condenser 65 by opening (or fully opening if previously throttled) coolant valve 143), and (iv) resetting the second expansion valve 54 to a typical pressure drop such that the refrigerant that flows therethrough and enters the chiller at a low enough pressure and a corresponding low enough temperature to cause the refrigerant to vaporize due to the recipe of heat from the cooling water 130/132 that flows therethrough.

The controller 1000 maintains the system in this alignment until the next time that it is determined that the deicing mode is needed.

In some embodiments, a first pressure sensor 120 is provided, which may be just downstream of the evaporator 40, and additionally or alternatively a first temperature sensor 121 is provided just downstream of the evaporator 40. The first pressure sensor 120 and/or the first temperature sensor 121 sends a signal to the controller 1000 that is the sensed pressure and/or temperature or is representative of the sensed pressure/temperature such that the controller 1000 can readily interpret the sensed pressure and/or temperature from the signal. The controller 1000 may be configured to determine that a deicing cycle is needed based upon the receipt of the sensed pressure and/or temperatures, such as if the sensed temperature and pressure reflect that the refrigerant is not fully saturated vapor, but instead has a quality less than 100%, which is an indication that the evaporator 40 is not performing as designed, likely because of a frost/ice layer that has reduced the ability for heat from the air flow AA to be transferred to the evaporator 40.

In any of the embodiments herein where the controller 1000 identifies that a deicing cycle is needed based upon the receipt of a monitored parameter (which can be one or of the various monitored parameters identified herein) that is outside of its normal expected band with operation of the system 10—e.g. that the refrigerant flowing from the evaporator 40 is not fully saturated vapor, the controller 1000 may identify that the ice/frost layer has melted due to one or more of the passage of time during the deice cycle that is programmed to reflect that all or a substantial portion of the ice has melted, or a direct or indirect indication that the ice/frost layer has melted such as with a frost sensor 128 no longer identifying the presence of ice/frost on the surface of the evaporator 40, or by other indications. In these embodiments, once the deice cycle is discontinued and the regular operation of the system 10 is restored, as discussed herein, the controller 1000 monitors the parameters of the system (e.g. the pressure and/or temperature sensors 120, 121 at the evaporator 40 outlet. If those monitored parameters have returned to normal values for normal operation, it can be confirmed that the frost/ice layer has melted. In embodiments, where the controller 1000 relies upon a time duration between deicing settings—the controller 1000 may continue to delay a deice cycle (even if called for due to an elapse of time) if the monitored parameters of the refrigerant are still within their normal bands during normal operation—and the controller in that circumstance would not initiate a deicing cycle until after the elapse of time has occurred and the monitored parameters begin a trend away from their normal operating parameters.

In other embodiments, the controller 1000 may have sensors that sense the inlet air temperature AA and the outlet air temperature BB (129*a*, 129*c*—schematic), as well as the air flow rate (129*b*) across the evaporator 40. With the knowledge of the performance of the evaporator (such as by the sensed outlet pressure and temperature from sensors 120, 121) as well as a comparison of the inlet and outlet air temperatures and flow rate, the controller 1000 may determine that a deice cycle is needed, such as if the difference between the inlet and outlet air temperatures for a given air flow rate, drops below a determined minimum difference.

In some embodiments, the controller 1000 may sense the inlet air temperature 129*a* and may sense air humidity 128*b* proximate to the evaporator 40, and with the sensed temperature and humidity, may determine that it is likely that a frost layer has developed during operation for a certain time (i.e. one hour, four hours, etc.) that conditions are such that it is likely that a frost/ice layer has formed and therefore a deicing cycle is needed. In some embodiments, the controller 1000 may be programmed with specific periodic deicing frequencies for different combinations of air temperatures and/or different humidity levels. In some embodiments, the controller 1000 may not directly measure one or both of the air temperature and/or humidity but instead may receive those from a remote source-such as a weather service that broadcasts this data (such as via a cellular network, a radio network, a satellite network or the like) and there determine the desired frequency for a deicing sequence. In this embodiment, the system may also be programmed with average temperatures and humidity data for a given location (such as a given location as understood with GPS coordinates, or the like) and at a given time and at a given calendar date within the year and determine the desired frequency for deicing based upon that programmed data for a given GPS location. This embodiment may be as an alternative to the embodiment where the controller 1000 receives temperature and humidity data from a weather service, or the controller 1000 may use the programmed historical data in situations where the weather service data is not received or is not available in a location where the vehicle is currently.

In still other embodiments, the controller 1000 may be programmed to operate the deicing cycle at a given frequency based upon the calendar date. In still other embodiments, the controller may be programmed to operate the deicing cycle at a given frequency that is always the same—either regardless of the sensed parameters discussed with respect to the above embodiments, or where the controller 1000 does not sense all or any of the parameters above.

In still other embodiments, the an ice sensor 128 (schematic) may be provided upon a surface of the evaporator 40, and upon the controller's receipt of a signal that ice has been formed the controller 1000 may determine that a deicing cycle is needed. In a related embodiment or this embodiment, the ice sensor 128 may also sense a surface temperature of the evaporator surface. In a related embodiment, the controller 1000 may be programmed to initiate a deicing cycle after a set delay time after an initial signal is received from the ice sensor 128—which is indicative that a certain amount of ice has formed that is experimentally determined to be detrimental to performance of the evaporator 40. In a related embodiment where an ice sensor 128 is provided, the controller 1000 may be configured to initiate a deice signal when it receives an initial signal that ice has formed from the ice sensor 128, and when it receives a secondary indication of degrading performance (such as one or more of the refrigerant or air sensed parameters changing away from the nominal values that indicate normal performance of the evaporator 40—which is indicative of the ice formation of a sufficient amount to degrade evaporator 40 performance.

FIG. 2 depicts a modified system 10. The system of FIG. 2 may include some or all of the structure associated with FIG. 1 as discussed in the various embodiments of FIG. 1 discussed above, and the system 10 additionally includes an internal heat exchanger 400, which includes a first flow path 401 where the refrigerant flowing from the internal condenser 65 flows, and a second flow path 402 where the refrigerant leaving the evaporator 40 flows. The internal heat exchanger 400 may result in the refrigerant flowing into the expansion valve 44 being supercooled, which may introduce performance improvement in allowing the refrigerant to remove additional heat from the air flow AA across the evaporator 40 than it would if the refrigerant reached the expansion valve as saturated liquid.

In an alternate embodiment depicted in FIG. 3 the system 10 may be modified such that the three way valve 180 is replaced with two remotely operable valves 381, 382 and a check valve in order to obtain the same functionality. Specifically, an isolation valve 382 is provided in the line that cross-connects the lines of flow Y and Z (FIG. 3, schematic) such that the flow X is allowed when isolation valve 382 is open and prevented when valve 382 is shut. Another valve 381 is provided downstream of the cross-connect valve that allows flow in direction V (also direction Y—FIG. 3) when open and prevents this flow when shut. Finally a check valve 383 may be provided downstream of the evaporator 60 to prevent backflow into the evaporator (flow direction through cross-connect line in the opposite direction to direction X. The isolation valves 381, 382 (as well as isolation valve 190) are controlled by the controller 1000 to achieve the different flow modes as discussed above with respect to the three way valve 180. In other embodiments, the embodiment of FIG. 2 may be modified to include valves 382, 381, 383 to replace the three way valve 180 in that embodiment and be situated and operate in the same manner as depicted in FIG. 3 and described above.

The term "about" is specifically defined herein to include a range that includes the reference value and plus or minus 5% of the reference value. The term "substantially the same" is when the item under comparison is within 5% of the aspect of the reference value of the item.

The computing elements or functions disclosed herein, such as the controller 1000 may include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory. Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Naturally, in view of the teachings and disclosures herein, persons having ordinary skill in the art may appreciate that alternate designs and/or embodiments of the invention may be possible (e.g., with substitution of one or more components for others, with alternate configurations of components, etc.). Although some of the components, relations, configurations, and/or steps according to the invention are not specifically referenced and/or depicted in association with one another, they may be used, and/or adapted for use, in association therewith. All of the aforementioned and various other structures, configurations, relationships, utilities, any which may be depicted and/or based hereon, and the like may be, but are not necessarily, incorporated into and/or achieved by the invention. Any one or more of the aforementioned and/or depicted structures, configurations, relationships, utilities and the like may be implemented in and/or by the invention, on their own, and/or without reference, regard or likewise implementation of any of the other aforementioned structures, configurations, relationships, utilities and the like, in various permutations and combinations, as will be readily apparent to those skilled in the art, without departing from the pith, marrow, and spirit of the disclosed invention While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The specification can be best understood with reference to the following Numbered Paragraphs:

Numbered Paragraph 1. A heat pump system, comprising:

a closed loop for refrigerant flow, the closed loop comprises a plurality of components that refrigerant flows through, the plurality of components include an evaporator, an expansion valve, a compressor, a heat pump heater that comprises a first condenser, and a second condenser wherein refrigerant flows continuous through loop and through the components continuously, and a flow of forced air across the heat pump heart and the evaporator;

wherein the expansion valve is first expansion valve that is disposed upstream of and adjacent to the evaporator, wherein the first expansion valve is remotely controllable in order to adjust a refrigerant pressure drop that occurs as refrigerant passes through the first expansion valve, wherein the system is operated such that the heat pump heater transfers heat to a forced air flow across the heat pump heater to generate a flow of warm air for transfer into a vehicle passenger compartment, and the evaporator is operated such that the evaporator removes heat from the forced air across the evaporator to generate a flow of cool air for transfer into the vehicle passenger compartment, wherein during a first mode of operation of the system a refrigerant temperature entering the evaporator may be such that an outer heat transfer surface of the evaporator causes moisture upon the outer heat transfer surface to freeze upon the outer heat transfer surface;

wherein periodically during a second mode of operation of the system the first expansion valve is adjusted to decrease a pressure drop of refrigerant that flows through the first expansion valve such that a pressure of refrigerant entering the evaporator increases such that a corresponding refrigerant temperature increases thereby transferring heat through the evaporator and to the outer heat transfer surface to cause the frozen layer upon the outer surface of the evaporator to melt.

Numbered Paragraph 2: The heat pump system of Numbered Paragraph 1, further comprising a second flow path, and a third flow path;

wherein the second flow path allows refrigerant flow from the second condenser to flow to a second expansion valve and then to a second heat exchanger and then to the compressor and not flow through the first expansion valve and the evaporator;

wherein the third flow path allows refrigerant flowing from the evaporator to flow directly to the compressor.

Numbered Paragraph 3: The heat pump system of Numbered Paragraph 2, wherein during a cycle of refrigerant flow, a first portion of refrigerant leaving the second condenser flows to the first expansion valve, the evaporator and then through the third flow path directly to the compressor, and a second remaining portion of the refrigerant flow leaving the second condenser flows through the second flow path through the second expansion valve and the second heat exchanger and then directly to the compressor.

Numbered Paragraph 4. The heat pump system of any one of Numbered Paragraphs 2-3, further comprising a three way valve that is connected to a flow path from an outlet of the evaporator, the second flow path, and the third flow path.

Numbered Paragraph 5. The heat pump system of Numbered Paragraph 4, wherein during the first mode of operation, refrigerant flowing from the evaporator flows through the three way valve and through the third flow path to the compressor and some refrigerant bypasses the evaporator and the third flow path and instead flows through the second flow path to the second heat exchanger and then to the compressor, wherein during the second mode of operation, flow through the three way valve is altered such that refrigerant flow flowing from the evaporator flows into the second flow path toward the second heat exchanger.

Numbered Paragraph 6. The heat pump system of any one of Numbered Paragraphs 4-5, wherein the second flow path further comprises a second isolation valve that is upstream of a connection of the second flow path with the three way valve, wherein when in the second mode of operation the second isolation valve is shut thereby causing all refrigerant from the second condenser to flow through the first expansion valve and the evaporator.

Numbered Paragraph 7. The heat pump system of any one of Numbered Paragraphs 1-6, wherein during the first mode of operation, coolant flows through the second condenser, which lowers the temperature of the refrigerant due to heat loss from the refrigerant to a cooling liquid flowing through the second condenser, wherein during the second mode of operation no cooling liquid flows through the second condenser.

Numbered Paragraph 8. The heat pump system of any one of Numbered Paragraphs 2-7, wherein the second expansion valve within the second flow path is remotely controllable in order to adjust a refrigerant pressure drop that occurs as refrigerant passes through the second expansion valve.

Numbered Paragraph 9. The heat pump system of Numbered Paragraph 5, further comprising a controller that directs the operation of the first expansion valve and the positioning of the three way valve, wherein during normal operations the controller causes the first expansion valve to maintain a desired pressure drop in order to decrease the pressure and temperature of the refrigerant entering the evaporator as desired for cooling air that flows across the evaporator as desired by the controller, wherein when the controller identifies that it is desired modify the system to the second mode of operation, the controller causes the first expansion valve to become modified to decrease the pressure drop across the first expansion valve less than the pressure drop associated with the first mode of operation, and the controller causes the three way valve to be altered such that refrigerant flow reaching the three way valve from the evaporator flows to the second heat exchanger and does not flow through the third flow path.

Numbered Paragraph 10. The heat pump system of Numbered Paragraph 9, further comprising one or more sensors that monitor one or both of a pressure and a temperature of the refrigerant leaving the evaporator and provides the monitored pressure and/or temperature to the controller, wherein the controller is configured to modify the operation of the system from the first mode of operation to the second mode of operation based upon the monitored temperature and/or pressure from the one or more sensors.

Numbered Paragraph 11. The heat pump system of Numbered Paragraph 10, wherein the controller is configured to maintain the system in the second mode of operation for a pre-determined time that is calibrated to result in all or a substantial portion of the frozen layer upon the outer surface of the evaporator to melt based upon the monitored temperature of the refrigerant reaching the first expansion valve.

Numbered Paragraph 12. The heat pump system of Numbered Paragraph 10, wherein the controller is configured to maintain the system in the second mode of operation for a pre-determined time that is calibrated to result in all or a substantial portion of the frozen layer upon the outer surface of the evaporator to melt based upon the monitored pressure of the refrigerant leaving the evaporator.

Numbered Paragraph 13. The heat pump system of any one of Numbered Paragraphs 9-12, further comprising a sensor that monitors an air temperature proximate to an outer surface of the evaporator or a sensor that monitors an outer surface temperature of the evaporator, wherein the controller is configured to modify the operation of the system from the first mode of operation to the second mode of operation based upon the monitored temperature and/or pressure.

Numbered Paragraph 14. The heat pump system of any one of Numbered Paragraphs 9-13, further comprising an isolation valve that can be positioned to an open position to allow cooling liquid flow through the second condenser or to a shut position to prevent cooling liquid flow through the second condenser, wherein the controller is configured to control the position of the isolation valve, wherein during normal operations the controller causes the isolation valve to be open and during the second mode of operation the controller causes the isolation valve to be partially or fully shut thereby minimizing or eliminating a reduction in temperature of the refrigerant that flows through the second condenser.

Numbered Paragraph 15. The heat pump system of any one of Numbered Paragraphs 1-14, further comprising an internal heat exchanger such that a refrigerant flow path flowing into the first expansion valve flow through a first flow path through the internal heat exchanger and such that a refrigerant flow path flowing out of the evaporator flows through a second flow path through the internal heat exchanger, wherein the internal heat exchanger is configured to facilitate heat transfer between the first and second flow paths within the internal heat exchanger.

Numbered Paragraph 16. A method of operating a closed loop heat pump system:

wherein the closed loop heat pump system comprises a closed loop for refrigerant flow, the closed loop comprises a plurality of components that refrigerant flows through, the plurality of components include an evaporator, an expansion valve, a compressor, a heat pump heater that comprises a first condenser, and a second condenser wherein refrigerant flows through loop and through the components continuously, wherein the expansion valve is a first expansion valve that is disposed upstream of and adjacent to the evaporator, wherein the first expansion valve is remotely controllable by a controller in order to adjust a refrigerant pressure drop that occurs as refrigerant passes through the first expansion valve, the method comprises the controller operating the heat pump system in a first mode wherein the heat pump heater transfers heat into a vehicle passenger compartment via a forced air flow thereby, and the evaporator to remove heat from the forced air that flows thereby, wherein during a first mode of operation of the system a refrigerant entering the evaporator may be at or less than a temperature of air that surrounds the evaporator causing heat transfer from air outside of the evaporator through one or more outer walls of the evaporator to the refrigerant flowing therethrough, thereby causing moisture upon the outer heat transfer surface to freeze over time with continued operation;

further comprising the controller operating the heat pump system periodically in a second mode of operation by adjusting a condition of the first expansion valve to cause the pressure drop of the refrigerant as the refrigerant flows through the first expansion valve to decrease such that a pressure of refrigerant entering the evaporator increases such that a corresponding refrigerant temperature increases thereby transferring heat through one or more walls of the evaporator to the outer heat transfer surface to cause the frozen layer upon the outer surface of the evaporator to melt.

Numbered Paragraph 17. The method of Numbered Paragraph 16, wherein the heat pump system comprises a second flow path, and a third flow path, wherein the second flow path allows a first portion of the refrigerant flow from the second condenser to flow to a second expansion valve and then to a second heat exchanger and then to the compressor and not flow through the first expansion valve and the evaporator, and the third flow path allows a remaining portion of the refrigerant flow from the second condenser to flow through the evaporator and to flow through the third flow path directly to the compressor, wherein when in the first mode of operation, the controller causes the remaining portion of refrigerant leaving the second condenser to flow to the first expansion valve, the evaporator and then through the third flow path directly to the compressor, and the first portion of the refrigerant flow leaving the second condenser to flow through the second flow path through the second expansion valve and the second heat exchanger and then directly to the compressor, wherein when in the second mode of operation the controller causes all of the refrigerant leaving the second condenser to flow through the first expansion valve and the evaporator.

Numbered Paragraph 18. The method of Numbered Paragraph 17, wherein the system includes a three way valve that is connected to a flow path from an outlet of the evaporator, the second flow path, and the third flow path, wherein when in the first mode of operation the controller causes the three way valve to direct refrigerant flow from the outlet of the evaporator to flow through the third flow path to the compressor, and the flow that bypasses the evaporator to flow through the second flow path and ultimately to the second heat exchanger, wherein when in the second mode of operation that controller causes the three way valve to reorient flow such that the refrigerant flow from the outlet of the evaporator flows into the second flow path through the second heat exchanger and ultimately to the compressor.

Numbered Paragraph 19. The method of Numbered Paragraph 18, wherein a second isolation valve is provided in the second flow path and upstream of a connection between the second flow path and a three way valve, wherein the controller causes the second isolation valve to shut when in the second mode of operation to cause all refrigerant leaving the compressor to flow through the first expansion valve and the evaporator.

Numbered Paragraph 20. The method of any one of Numbered Paragraphs 16-20, further comprising the controller allowing coolant flow through the second condenser when in the first mode of operation and the controller reducing or preventing cooling flow through the second condenser when in the second mode of operation.

Numbered Paragraph 21. The method of any one of Numbered Paragraphs 16-20, wherein the system comprises one or more sensors that monitor one or both of a pressure and a temperature of the refrigerant leaving the evaporator and provides the monitored pressure and/or temperature to the controller, wherein the controller operates the system in the second mode of operation for a pre-determined time that is calibrated to result in all or a substantial portion of the frozen layer upon the outer surface of the evaporator to melt or until the controller otherwise receives an indication representative of a status when the frozen layer has fully or substantially melted.

Numbered Paragraph 22. The method of any one of Numbered Paragraphs 16-21, wherein the controller monitors a temperature and/or a humidity level outside of the evaporator and wherein the controller after an amount of time based upon the monitored temperature and/or humidity level outside of the evaporator when operating in the first mode of operation causes the system to transition from the first mode of operation to the second mode operation, and stay in the second mode of operation for a second period of time, and at the end of the second period of time the controller causes the system to return to the first mode of operation.

The invention claimed is:

1. A heat pump system, comprising:

a closed loop for refrigerant flow, the closed loop comprises a plurality of components that refrigerant flows through, the plurality of components include an evaporator, an expansion valve, a compressor, a heat pump heater that comprises a first condenser, and a second condenser disposed directly downstream of the first condenser, wherein refrigerant flows continuously through the closed loop and through the components continuously, and a flow of forced air across the heat pump heater and the evaporator;

wherein the expansion valve is a first expansion valve that is disposed upstream of and adjacent to the evaporator, wherein the first expansion valve is remotely controllable in order to adjust a refrigerant pressure drop that occurs as refrigerant passes through the first expansion valve, wherein the system is operated such that the heat pump heater transfers heat to the forced air flow across the heat pump heater to generate a flow of warm air for transfer into a vehicle passenger compartment, and the evaporator is operated such that the evaporator removes heat from the forced air across the evaporator to generate a flow of cool air for transfer into the vehicle passenger compartment, wherein during a first mode of operation of the system a refrigerant temperature entering the evaporator may be such that an outer heat transfer surface of the evaporator causes moisture upon the outer heat transfer surface to freeze upon the outer heat transfer surface;

wherein periodically during a second mode of operation of the system the first expansion valve is adjusted to decrease a pressure drop of refrigerant that flows through the first expansion valve such that a pressure of refrigerant entering the evaporator increases such that a corresponding refrigerant temperature increases thereby transferring heat through the evaporator and to the outer heat transfer surface to cause the frozen layer upon the outer surface of the evaporator to melt, further comprising a second flow path, and a third flow path;

wherein the second flow path allows refrigerant flow from the second condenser to flow to a second expansion valve and then to a second heat exchanger and then to the compressor and not flow through the first expansion valve and the evaporator;

wherein the third flow path allows refrigerant flowing from the evaporator to flow directly to the compressor, and wherein during a cycle of refrigerant flow, a first portion of refrigerant leaving the second condenser flows to the first expansion valve, the evaporator and then through the third flow path directly to the compressor, and a second remaining portion of the refrigerant flow leaving the second condenser flows through the second flow path through the second expansion valve and the second heat exchanger and then directly to the compressor.

2. The heat pump system of claim 1, further comprising a three way valve that is connected to a flow path from an outlet of the evaporator, the second flow path, and the third flow path.

3. The heat pump system of claim 2, wherein during the first mode of operation, refrigerant flowing from the evaporator flows through the three way valve and through the third flow path to the compressor and some refrigerant bypasses the evaporator and the third flow path and instead flows through the second flow path to the second heat exchanger and then to the compressor, wherein during the second mode of operation, flow through the three way valve is altered such that refrigerant flow flowing from the evaporator flows into the second flow path toward the second heat exchanger.

4. The heat pump system of claim 3, wherein the second flow path further comprises a second isolation valve that is upstream of a connection of the second flow path with the three way valve, wherein when in the second mode of operation the second isolation valve is shut thereby causing all refrigerant from the second condenser to flow through the first expansion valve and the evaporator.

5. The heat pump system of claim 3, wherein during the first mode of operation, coolant flows through the second condenser, which lowers the temperature of the refrigerant due to heat loss from the refrigerant to a cooling liquid flowing through the second condenser, wherein during the second mode of operation no cooling liquid flows through the second condenser.

6. The heat pump system of claim 1, wherein the second expansion valve within the second flow path is remotely controllable in order to adjust a refrigerant pressure drop that occurs as refrigerant passes through the second expansion valve.

7. The heat pump system of claim 3, further comprising a controller that directs the operation of the first expansion valve and the positioning of the three way valve, wherein during normal operations the controller causes the first expansion valve to maintain a desired pressure drop in order to decrease the pressure and temperature of the refrigerant entering the evaporator as desired for cooling air that flows across the evaporator as desired by the controller, wherein when the controller identifies that it is desired modify the system to the second mode of operation, the controller causes the first expansion valve to become modified to decrease the pressure drop across the first expansion valve less than the pressure drop associated with the first mode of operation, and the controller causes the three way valve to be altered such that refrigerant flow reaching the three way valve from the evaporator flows to the second heat exchanger and does not flow through the third flow path.

8. The heat pump system of claim 7, further comprising one or more sensors that monitor one or both of a pressure and a temperature of the refrigerant leaving the evaporator and provides the monitored pressure and/or temperature to the controller, wherein the controller is configured to modify the operation of the system from the first mode of operation to the second mode of operation based upon the monitored temperature and/or pressure from the one or more sensors.

9. The heat pump system of claim 8, wherein the controller is configured to maintain the system in the second mode of operation for a pre-determined time that is calibrated to result in all or a substantial portion of the frozen layer upon the outer surface of the evaporator to melt based upon the monitored temperature of the refrigerant reaching the first expansion valve.

10. The heat pump system of claim 8, wherein the controller is configured to maintain the system in the second mode of operation for a pre-determined time that is calibrated to result in all or a substantial portion of the frozen layer upon the outer surface of the evaporator to melt based upon the monitored pressure of the refrigerant leaving the evaporator.

11. The heat pump system of claim 7, further comprising a sensor that monitors an air temperature proximate to an outer surface of the evaporator or a sensor that monitors an outer surface temperature of the evaporator, wherein the controller is configured to modify the operation of the system from the first mode of operation to the second mode of operation based upon the monitored temperature and/or pressure.

12. The heat pump system of claim 7, further comprising an isolation valve that can be positioned to an open position to allow cooling liquid flow through the second condenser or to a shut position to prevent cooling liquid flow through the second condenser, wherein the controller is configured to control the position of the isolation valve, wherein during normal operations the controller causes the isolation valve to be open and during the second mode of operation the controller causes the isolation valve to be partially or fully shut thereby minimizing or eliminating a reduction in temperature of the refrigerant that flows through the second condenser.

13. The heat pump system of claim 1, further comprising an internal heat exchanger such that a refrigerant flow path flowing into the first expansion valve flow through a first flow path through the internal heat exchanger and such that a refrigerant flow path flowing out of the evaporator flows through a second flow path through the internal heat exchanger, wherein the internal heat exchanger is configured to facilitate heat transfer between the first and second flow paths within the internal heat exchanger.

14. A method of operating a closed loop heat pump system:

wherein the closed loop heat pump system comprises a closed loop for refrigerant flow, the closed loop comprises a plurality of components that refrigerant flows through, the plurality of components include an evaporator, an expansion valve, a compressor, a heat pump heater that comprises a first condenser, and a second condenser wherein refrigerant flows through loop and through the components continuously, wherein the expansion valve is a first expansion valve that is disposed upstream of and adjacent to the evaporator, wherein the first expansion valve is remotely controllable by a controller in order to adjust a refrigerant pressure drop that occurs as refrigerant passes through the first expansion valve, the method comprises the controller operating the heat pump system in a first mode wherein the heat pump heater transfers heat into a vehicle passenger compartment via a forced air flow thereby, and the evaporator to remove heat from the forced air that flows thereby, wherein during a first mode of operation of the system a refrigerant entering the evaporator may be at or less than a temperature of air that surrounds the evaporator causing heat transfer from air outside of the evaporator through one or more outer walls of the evaporator to the refrigerant flowing therethrough, thereby causing moisture upon the outer heat transfer surface to freeze over time with continued operation;

further comprising the controller operating the heat pump system periodically in a second mode of operation by adjusting a condition of the first expansion valve to cause the pressure drop of the refrigerant as the refrigerant flows through the first expansion valve to decrease such that a pressure of refrigerant entering the evaporator increases such that a corresponding refrigerant temperature increases thereby transferring heat through one or more walls of the evaporator to the outer heat transfer surface to cause the frozen layer upon the outer surface of the evaporator to melt, wherein the heat pump system comprises a second flow path, and a third flow path, wherein the second flow path allows a first portion of the refrigerant flow from the second condenser to flow to a second expansion valve and then to a second heat exchanger and then to the compressor and not flow through the first expansion valve and the evaporator, and the third flow path allows a remaining portion of the refrigerant flow from the second condenser to flow through the evaporator and to flow through the third flow path directly to the compressor, wherein when in the first mode of operation, the controller causes the remaining portion of refrigerant leaving the second condenser to flow to the first expansion valve, the evaporator and then through the third flow path directly to the compressor, and the first portion of the refrigerant flow leaving the second condenser to flow through the second flow path through the second expansion valve and the second heat exchanger and then directly to the compressor, wherein when in the second mode of operation the controller causes all of the refrigerant leaving the second condenser to flow through the first expansion valve and the evaporator.

15. The method of claim 14, wherein the system includes a three way valve that is connected to a flow path from an outlet of the evaporator, the second flow path, and the third flow path, wherein when in the first mode of operation the controller causes the three way valve to direct refrigerant flow from the outlet of the evaporator to flow through the third flow path to the compressor, and the flow that bypasses the evaporator to flow through the second flow path and ultimately to the second heat exchanger, wherein when in the second mode of operation that controller causes the three way valve to reorient flow such that the refrigerant flow from the outlet of the evaporator flows into the second flow path through the second heat exchanger and ultimately to the compressor.

16. The method of claim 15, wherein a second isolation valve is provided in the second flow path and upstream of a connection between the second flow path and a three way valve, wherein the controller causes the second isolation valve to shut when in the second mode of operation to cause all refrigerant leaving the compressor to flow through the first expansion valve and the evaporator.

17. The method of claim 14, further comprising the controller allowing coolant flow through the second condenser when in the first mode of operation and the controller reducing or preventing cooling flow through the second condenser when in the second mode of operation.

18. The method of claim 14, wherein the system comprises one or more sensors that monitor one or both of a pressure and a temperature of the refrigerant leaving the evaporator and provides the monitored pressure and/or temperature to the controller, wherein the controller operates the system in the second mode of operation for a pre-determined time that is calibrated to result in all or a substantial portion of the frozen layer upon the outer surface of the evaporator to melt or until the controller otherwise receives an indication representative of a status when the frozen layer has fully or substantially melted.

19. The method of claim 14, wherein the controller monitors a temperature and/or a humidity level outside of the evaporator and wherein the controller after an amount of time based upon the monitored temperature and/or humidity level outside of the evaporator when operating in the first mode of operation causes the system to transition from the first mode of operation to the second mode operation, and stay in the second mode of operation for a second period of time, and at the end of the second period of time the controller causes the system to return to the first mode of operation.

* * * * *